(12) United States Patent
Tibrea et al.

(10) Patent No.: US 6,647,700 B1
(45) Date of Patent: *Nov. 18, 2003

(54) PLASTIC CONTAINER BAGLESS TRANSFER

(75) Inventors: Steven L. Tibrea, Aiken, SC (US); Joseph A. D'Amelio, Martinez, GA (US); Brent A. Daugherty, Aiken, SC (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/488,604

(22) Filed: Jan. 20, 2000

Related U.S. Application Data
(60) Provisional application No. 60/128,799, filed on Apr. 12, 1999.

(51) Int. Cl.[7] .................................................. B67B 5/00
(52) U.S. Cl. ............................ 53/471; 53/510; 53/275
(58) Field of Search ......................... 53/471, 401, 404, 53/478, 489, 80, 510, 129.1, 274, 275, 296, 329.2, 331.5; 588/1, 16

(56) References Cited

U.S. PATENT DOCUMENTS

| | | | | |
|---|---|---|---|---|
| 4,014,723 A | * | 3/1977 | Jones | 156/69 |
| 4,173,858 A | * | 11/1979 | Cassia | 53/471 |
| 5,740,545 A | | 4/1998 | Maxwell et al. | |
| 2002/0005366 A1 | * | 1/2002 | Gordon et al. | 206/232 |

* cited by examiner

*Primary Examiner*—Stephen F. Gerrity
*Assistant Examiner*—John Paradiso
(74) *Attorney, Agent, or Firm*—J. Herbert O'Toole; Nexsen Pruet Jacobs & Pollard, LLC

(57) ABSTRACT

A process and apparatus are provided for transferring material from an isolated environment into a storage carrier through a conduit that can be sealed with a plug. The plug and conduit can then be severed to provide a hermetically sealed storage carrier containing the material which may be transported for storage or disposal and to maintain a seal between the isolated environment and the ambient environment.

7 Claims, 2 Drawing Sheets

PLASTIC CONTAINER BAGLESS TRANSFER

PRIORITY STATEMENT

This is an application for patent filed pursuant to 35 U.S.C. §111(a), and a claim of priority is made to Provisional Application Ser. No. 60/128,799 filed Apr. 12, 1999 in the names of the same inventors named herein.

GOVERNMENT RIGHTS

The United States Government has rights in this invention pursuant to Contract Number DE-AC09-96-SR18500 between the United States Department of Energy and Westinghouse Savannah River Company.

FIELD OF THE INVENTION

This invention relates generally to the removal of material from an isolated environment such as an isolation chamber for transport, storage, or disposal. More particularly, the invention relates to a method and apparatus for effecting a transfer of material from an isolation chamber while maintaining at all times the integrity of the isolation chamber, maintaining isolation of the transfer container, and leaving no residual material, such as contaminants, on the sealing surfaces of the chamber and/or container.

BACKGROUND OF THE INVENTION

Many research and industrial processes involve the use of environmentally undesirable or toxic materials. Examples of such materials are toxic materials used in or produced by chemical, biological, or nuclear research or production methods. These processes, and the materials used therein, are isolated from the ambient environment through the use of containment or isolation chambers such as gloveboxes and negative-pressure hoods, forming isolation chambers.

The undesirable or toxic materials used or produced in these isolation chambers must be safely removed from the environments for transportation and further processing or disposal. The nature of the materials requires that the integrity of the isolation be maintained at all times, with respect to both the chamber and to the container used to transfer the materials. It is also necessary to ensure that no undesirable material residues be left on any surfaces external to the isolation chamber or the transfer container.

One current method of transferring the material is to place a container or "bag" into the isolation chamber. The materials are placed into the container which is sealed and then removed from the isolation chamber through what are known in the art as "bag-out ports." The use of bag-out ports creates special problems. The ports must be made so as to permit the introduction and removal of the containers, but must simultaneously maintain the integrity of the isolation chamber. Between transfers, the bag-out ports must be capable of being sealed or forming a seal so the isolated environment can be used, again without breaching the integrity thereof. The apparatus associated with, and the processes of, using bag-out ports make it difficult to handle large or irregularly shaped items and make it difficult to keep external surfaces free of contamination.

A highly specialized bagless transfer system for use with certain relatively high-level nuclear materials is disclosed in U.S. Pat. No. 5,740,545, issued Apr. 14, 1998, and assigned to Westinghouse Savannah River Company. The disclosed apparatus and process are specific to the particularly designed metal containers into which the material is transferred from a glovebox and to the handling apparatus for the containers.

The referenced patent discloses a handling apparatus which manipulates the metal container and inserts it through a seal in the glovebox. Radioactive material in the glovebox is placed into the container. A specifically designed hollow metal plug, manufactured to possess very close physical and dimensional tolerances, is placed within the container at a predetermined location therein. A rotary welder, such as a TIG welder, is used to form a weld between the plug and the container, after which a defined cutting means severs the weld.

Because the plug is hollow, the severing results in a portion of the container remaining in the glovebox seal, the portion closed off by the plug half in that portion. The other plug half forms a seal for the metal container itself, which may then be transported for disposal.

While the apparatus and method of the referenced patent have been used with the radioactive materials, it is of little or no practical use with other materials and other types, sizes, or shapes of containers. The disclosure of the referenced patent requires the use of special materials and extraordinarily precise manufacturing tolerances to form the metal container and metal plug. Likewise, relatively complicated manipulation means are required to perform the metal welding and sever the weld. For example, the patent requires the use of a rotary welder tip and a set of circular cutting blades. Each of these devices must be precisely positioned and manipulated. Likewise, the shape and size of the container itself are necessarily limited.

There is therefore a need for a process and apparatus to effect a bagless transfer of material, the process and apparatus being adaptable for use with a wide variety of materials and containers, and capable of use with substances other than metal.

SUMMARY OF THE INVENTION

It is an object of this invention to provide a novel and widely practicable apparatus and process for effecting the clean, contamination-free transfer of materials from an isolation chamber.

It is also an object of this invention to provide a contamination transfer system capable of use with containers of varying shapes and sizes.

It is likewise an object of this invention to provide a cost effective bagless transfer system suitable for use with different kinds of environmentally undesirable or toxic materials.

It is furthermore an object of this invention to provide cost-effective and relatively uncomplicated processes and apparatus for effecting bagless transfer.

These and other objects of the invention are provided by a method for effecting bagless transfer of material from an isolation chamber into a storage carrier, the method comprising the steps of communicating between said isolation chamber and said storage carrier through a conduit, said storage carrier being in hermetic relationship with said conduit and having an interior therein in communication with said isolation chamber through said conduit; transferring said material through said conduit into said interior of said storage carrier; inserting a plug into said conduit, said plug having an upper surface, a lower surface and a circumferential wall connecting said upper surface and said lower surface; radially sealing said circumferential wall to said conduit to divide said conduit into a sealed first portion communicating with said storage carrier containing said material and a second portion hermetically isolated from said sealed first portion and in communication with said isolation chamber; and severing said conduit and said plug at a point between said upper surface and said lower surface of said plug to remove said sealed first portion of said storage carrier from said second portion to permit relocation of said material within said storage carrier. Apparatus capable of being used in the process is also provided.

BRIEF DESCRIPTION OF THE DRAWINGS

FIGS. 2a–f is a diagrammatic illustration of the major steps of the bagless transfer method according to the invention.

DETAILED DESCRIPTION OF THE INVENTION

Figure 1:
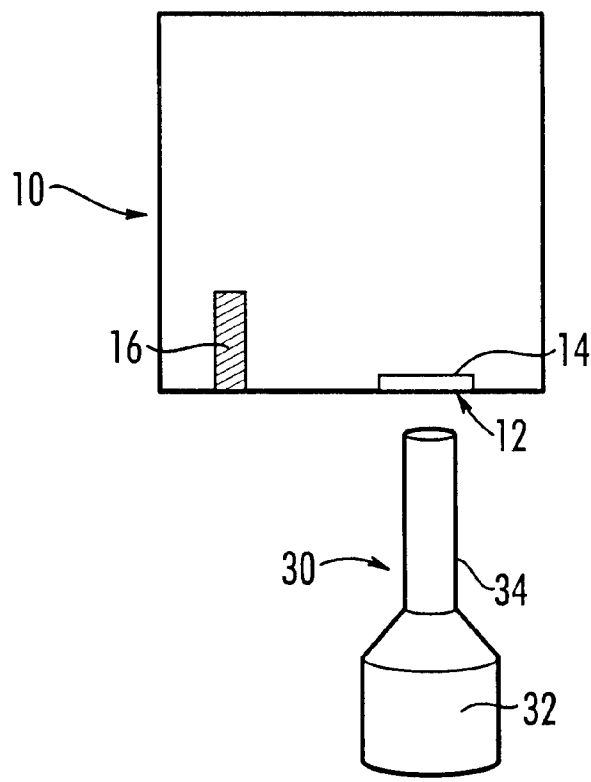
FIG. 1 is a diagrammatic illustration of an isolation chamber and a storage carrier to be used according to the invention.

The process and apparatus of this invention are not limited to one particular type of isolation chamber, material to be transferred, or storage container, that is, it does not have the narrow restrictions of existing methods. The figures are thus representational, with precise arrangements depending on the use and easily determinable by those of ordinary skill in the art. Like numbering in the drawings indicates like elements.

FIG. 1 illustrates an isolation chamber 10 and a storage carrier 30. Isolation chamber 10 can be a glovebox, such as is used for handling certain radioactive and other extremely toxic materials; a laboratory hood typically operating under a negative air flow; or any other enclosure, chamber, or room which is isolated from the ambient environment for purposes of segregating material that may be toxic or undesirable. For illustration purposes only, a material 16 to be transferred is shown inside isolation chamber 10.

Isolation chamber 10 has a sealed opening 12. In a preferred embodiment of the invention, opening 12 is sealed to preserve the integrity of isolation chamber 10 by a normally closed seal illustrated in FIG. 1 as seal 14. A typical seal for such an isolation chamber is a sphincter seal, but other types of seals such as normally-closed flap seals are also known. In applications such as use with a negative airflow hood, the seal may not be completely sealing.

Whatever configuration the seal 14 takes, it must be dimensioned or provided with a resilient gasket such that the seal integrity is maintained before, during, and after the bagless transfer is completed. The gasket may be the seal itself, as in the case of a sphincter seal, or may be a separate component of opening 12.

FIG. 1 also shows a schematic depiction of a storage carrier 30. The size, shape, and construction of storage carrier 30 will depend on the use to which it is put, such as the type of material to be transferred, as is known to those of skill in the art. Storage carrier 30 may be a type of plastic such as polyethylene or may be of some other construction such as fiberglass, cloth, or combination of any of these. It may be rigid or flexible, again depending on its ultimate use and the material to be transferred.

The storage carrier 30 has an interior 32 into which the material to be transferred will be placed. Communicating with interior 32 is a conduit 34. Conduit 34 may be of the same construction as the rest of storage carrier 30 and either an integral part thereof or attached thereto. In other uses, conduit 34 may be of one construction while the remainder of storage carrier 30 is of another. In either case, storage carrier 30 must be hermetically sealed to conduit 34 to ensure that the integrity of isolation chamber 10 and storage carrier 30 is not breached.

In a preferred embodiment, conduit 34 will have a generally circular cross-section. Other shapes are possible and may be used, but a circular cross-section appears to be most efficient when used in conjunction with a seal such as sphincter seal 14. Conduit 34 is generally hollow throughout its length and is open so as to allow material to be transferred into interior 32. As will be discussed hereafter, conduit 34 may have projecting shapes or ledges on the interior thereof, or may have differing dimensions along its length, or neither.

Figure 2A:
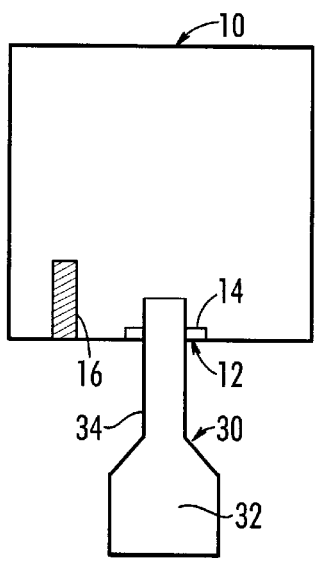
Figure 2B:
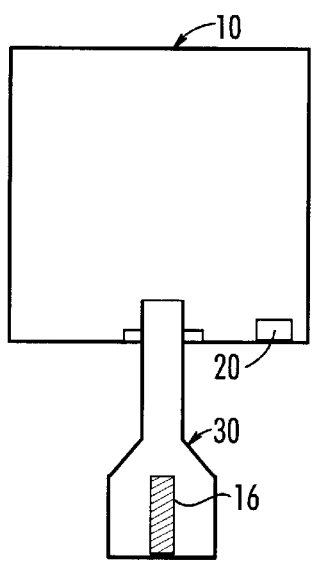

A preferred method of the invention is schematically illustrated in FIGS. 2a–e. To effect a bagless transfer of material, storage carrier 30 and isolation chamber 10 are placed in communication by inserting conduit 34 through opening 12. Seal 14, such as a sphincter seal, maintains the integrity of isolation chamber 10 with respect to the ambient environment. FIG. 2b shows that the material 16 to be transferred has been to the interior of storage carrier 30.

Figure 2C:
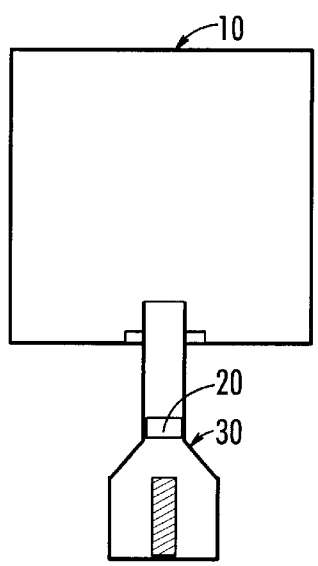
Figure 2D:
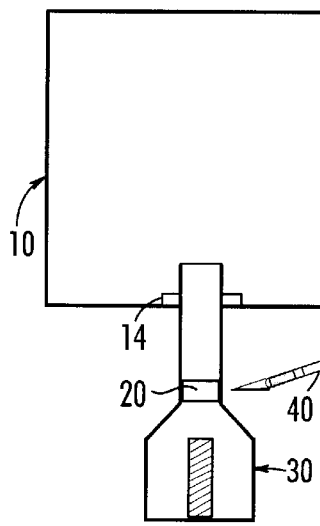

Also shown in FIG. 2b is a plug 20. As shown in FIG. 2c, plug 20 is placed inside conduit 34 to form a seal between the isolation chamber 10 and the interior of storage carrier 30.

Figure 4:
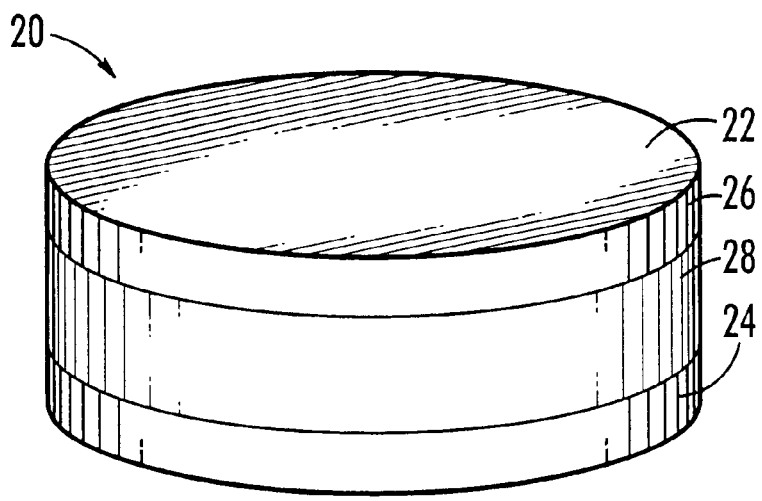
FIG. 4 is a plan view of a plug according to the invention.

Plug 20 is shown in more detail in FIG. 4. Plug 20 has an upper surface 22 and a lower surface 24 connected by a circumferential wall 26. Plug 20 may be a solid integral object consisting of a single compound such as a plastic, or may be hollow. Alternatively, upper surface 22 and lower surface 24 may be made of one compound, such as a fiberglass or a particular plastic, while circumferential wall 26 is made of a different compound. The material from which upper and lower surfaces 22 and 24 are made and the material from which circumferential wall 26 is made must be compatible for the purposes of manufacturing the plug, but otherwise may differ in degree or kind. In some uses, it may be advantageous to form each of upper surface 22, lower surface 24, and circumferential wall 26 out of differing materials.

Plug 20 is dimensioned to fit within conduit 34 to eventually form a hermetic seal. Inasmuch as it is a preferred form of this invention that conduit 34 be generally circular in cross-section, it is likewise preferred that upper surface 22 and lower surface 24 be generally circular.

Figure 3:
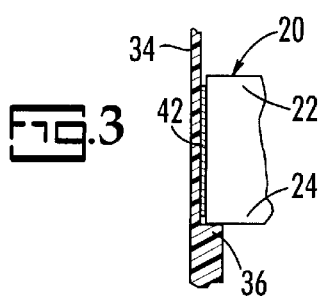
FIG. 3 is a cross-sectional close-up showing a plug sealed to the conduit of a storage carrier.

Plug 20 and conduit 34 may be dimensioned with respect to each other such that plug 20 can be inserted and retained in conduit 34. Alternatively, the composition of conduit 34 may be such that it has some elasticity, permitting insertion of plug 20 without allowing plug 20 to pass through to the interior of storage carrier 30. Still another alternative is illustrated in FIG. 3, showing a cross-section of a portion of conduit 34 with plug 20 inserted therein. A shelf or projection 36 may be added to or formed on an interior portion of conduit 34 prior to inserting the plug. Projection 36 may be a single projection, a multitude of projections, or a circular shelf. Alternatively, projection 36 may be a portion of conduit 34 that is tapered sufficiently to retain plug 20. Projection 36 should be large enough to retain plug 20 while not interfering with the transfer of material to the interior 32 of storage carrier 30.

Once plug 20 has been placed in conduit 34 as illustrated in FIG. 2c, a radial seal between plug 20 and conduit 34 is formed. The seal should be completely radial, that is, extend all the way around circumferential wall 26 to maintain the complete isolation of material 16. The way in which the seal is formed will depend on factors such as the composition of plug 20 and conduit 34, the strength of the seal required, and other factors known to or discernible by those of skill in the art.

In a preferred embodiment of the invention, plug 20 is constructed of plastic. Circumferential wall 26, or at least a portion thereof, shown as belt 28 in FIG. 4, is made of a plastic compound having characteristics, e.g., melting point, different from the plastic compound from which upper surface 22 and lower surface 24 are formed. Belt 28 may be the whole of circumferential wall 26 or, as shown in FIG. 4, only a portion thereof.

In one embodiment of the invention, once plug 20 is inserted in conduit 34, plug 20 is subjected to heating sufficient to raise belt 28 to the melting point thereof, causing it to radially fuse with conduit 34. The fusing is shown as 42 in FIG. 3. The heating may be accomplished by any of several known methods, including infrared, laser, microwave, and radiant heating.

Another preferred embodiment of the invention utilizes sonic welding. Here also, circumferential wall 26 or belt 28 may be made of a substance more susceptible to sonic welding than are upper surface 22 and lower surface 24. The sonic welding must form a fusing 42 sufficiently wide for the further steps set forth below.

Still another alternative is to use any of several known adhesives. The adhesive can be applied to circumferential wall 26 prior to insertion of plug 20 into conduit 34 or applied afterward from within isolation chamber 10. However it is applied, the adhesive must, as stated above, form a fusing wide enough for the further steps of the method.

While it is contemplated that any method used to seal plug 20 with and into conduit 34 will be used to form a complete and effective seal, the choice of method may depend on several factors. The materials from which plug 20 and conduit 34 are formed, the type of contamination to be contained, and environmental safety factors (e.g., whether a heat source is permitted in proximity to the isolation chamber) are examples of such factors.

There is a specific advantage to forming upper surface 22 and lower surface 24 from one compound, e.g., high density polyethylene, and circumferential wall 26 or belt 28 from another compound (or from the same type of compound, but having different characteristics). The higher susceptibility of circumferential wall 26 or belt 28 to the sealing method, e.g., heat, allows the radial seal to be formed without damaging either conduit 34 or the surfaces 22 and 24 of plug 20. This preserves the integrity of the isolation chamber 10 and of storage carrier 30.

This also permits the use of differing shapes for plug 20 and conduit 34. While it is preferred for reasons of convenience and strength that these elements be circular, the specific demands of the environment, the materials being transferred, or the storage and carrying (e.g. shipping) requirements may create the need for other shapes such as square or irregular. The method and apparatus of the current invention are adaptable to such shapes, whereas prior methods were not.

The formation of the radial seal effectively creates two closed and isolated environments. The seal creates a first sealed portion consisting of storage carrier 30 and the interior 32 thereof, including material 16. This portion is sealed from the isolation chamber by plug 20. A second sealed portion is created by plug 20, the part of conduit 34 above plug 20, and the interior of isolation chamber 10. These first and second portions will remain isolated from one another, and material 16 will not be exposed to the ambient environment.

After plug 20 has been inserted into conduit 34 and the radial seal has been formed, storage carrier 30 must be separated from isolation chamber 10 without breaching the integrity of isolation chamber 10 or the integrity of storage carrier 30. In the preferred method of this invention, referring for example to FIG. 2c, plug 20 or at least the point at which the radial seal is to be formed is seated in conduit 34 below seal 14. That is, plug 20 is inserted, from within isolation chamber 10, into conduit 34, and ledge or taper 36 is completely outside chamber 10. The sealing operations necessary to create hermetic seal 42, if application of heat or sonic welding is utilized therefor, for example, can then be accomplished externally of chamber 10.

Subsequent to the formation of seal 42 by the selected sealing mechanism of adhesive, welding, etc., the two closed and isolated environments are separated. The separation is accomplished by severing conduit 34, and plug 20, at a point between surfaces 22 and 24 of plug 20 and through the fusing forming seal 42. This step may be accomplished, for example, by a cutter 40 shown in FIG. 2d. Cutter 40 may be a blade such as a knife edge or a straight or rotary saw. Severing could even be accomplished by simply breaking conduit 34, e.g., along pre-made score lines, so long as the break occurs through the fusing.

Figure 2E:
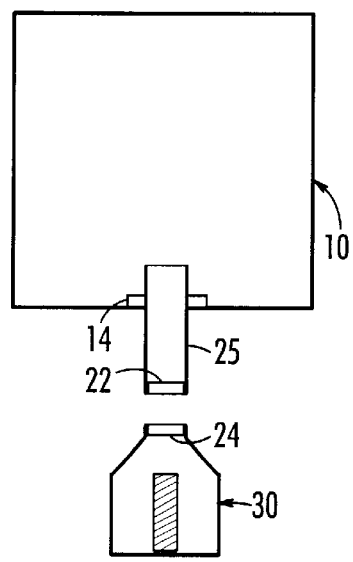

The severing must take place through the fusing to ensure that the separation does not breach the integrity of isolation chamber 10 or of storage carrier 30, the latter of which now contains the undesirable or toxic material 16. By severing conduit 34 in this way, the first and second portions referred to above remain sealed. As shown in FIG. 2e, after severing, a first portion consisting of storage carrier 30 and material 16, hermetically sealed and isolated from the ambient environment by bottom surface 24 of plug 20 can be transported away for further processing or storage. The second portion consists of isolation chamber 10 and an upper part 25 of conduit 34 hermetically sealed from the ambient environment by upper surface 22 of plug 20.

Because plug 20 is severed, the portions of the interior of plug 20 now exposed to the ambient environment are not contaminated by the contents of either isolation chamber 10 or storage carrier 30. The single plug 20 is severed into two plugs consisting of surfaces 22 and 24, allowing relocation of the storage carrier for, processing, storage, or disposal.

Hermetic and hermetically, as used herein, mean in the preferred sense that the seal is completely fluid (gas and liquid) tight. The seals provided by the surfaces 22 and 24 may, however, include seals that are only as complete as is required by the material 16 or the environment. The preferred fusion by heat sealing will be fluid tight.

The foregoing method may be then be repeated as often as necessary to transport material 16. Although not shown, a second storage container having a second conduit can be positioned at opening 12. As the second conduit is inserted in hole 12 and seal 14, it will displace upper part 25. Upper part 25 will be displaced from seal 14 without breaching the integrity of isolation chamber 10, and can be disposed of by other means.

The described process and the apparatus used therein overcome the problems inherent in prior art methods and apparatus. The apparatus is relatively simply and inexpensive. The method is not physically difficult, and is easily teachable to workers. The novel simplicity of the invention allows its use in almost any isolation chamber, such as the entire interior of a building being stripped of asbestos. It allows the use of almost any size and shape of storage carrier, making it useful to a wide variety of industries such as chemical, nuclear waste (especially low level wastes), asbestos abatement, and other waste disposal and material handling.

The steps of the method, and the apparatus used, as set forth above is somewhat exemplary. Because of the nature of the method and the apparatus, many widely varied alternatives are available for single steps or individual elements of the apparatus. The method and apparatus of this invention are intended to encompass all these variations, the invention being limited in scope only by the following claims.

What is claimed is:

1. A method for effecting transfer of material from an isolation chamber into a storage chamber, comprising:

communicating between said isolation chamber and said storage carrier through a plastic conduit, said storage carrier being in hermetic relationship with said conduit and having an interior therein in communication with said isolation chamber through said conduit;

transferring said material through said conduit into said interior of said storage carrier;

inserting a plug into said conduit, said plug having an upper surface, a lower surface and a plastic circumferential wall connecting said upper surface and said lower surface;

radially sealing said circumferential wall to said conduit to divide said conduit into a sealed first portion communicating with said storage container containing said material and a second portion hermetically isolated from said sealed first portion and in communication with said isolation chamber; and severing said conduit and said plug at a point between said upper surface and said lower surface of said plug to remove said scaled first portion of said storage carrier from said second portion to permit relocation of said material within said storage carrier.

2. The method of claim 1, wherein said circumferential wall of said plug comprises a first compound and said upper surface and said lower surface comprise a second compound, said first compound being preferentially responsive, with respect to said second compound, to the sealing effected by said radial sealing step.

3. The method of claim 1 further comprising:

displacing, subsequent to said severing, said second portion by establishing communication between said isolation chamber and a second storage carrier through a second conduit, said second storage carrier being in hermetic relationship with said second conduit and having an interior therein in communication with said isolation chamber through said second conduit.

4. The method of claim 1, wherein said radial sealing step comprises applying an adhesive, allowing an applied adhesive to cure, heating said circumferential wall of said plug to a temperature at which at least a portion of said circumferential wall bonds to said conduit, sonic welding, or a combination of the foregoing.

5. Apparatus for effecting a bagless transfer of material comprising:

an isolation chamber containing said material, said isolation chamber having a sealed opening;

a storage carrier having an interior and a plastic conduit in open communication with said interior;

a plug having an upper surface and a lower surface and a plastic circumferential wall connecting said upper surface and said lower surface;

whereby said conduit may be inserted through said sealed opening to effect communication between said interior and said isolation chamber, said material may be transferred through said conduit to said interior, and said plug may be placed within said conduit and radially sealed thereto to form a first hermetically sealed conduit portion in communication with said interior and a second hermetically sealed conduit portion in cormmunication with said isolation chamber.

6. The apparatus of claim 5, wherein the radial seal between said conduit and said plug is formed by an adhesive, heat treatment, or sonic welding.

7. The apparatus of claim 5, further comprising a projection formed on an interior surface of said conduit.

* * * * *